Feb. 19, 1963  W. M. HICKAM  3,077,638
METHOD FOR PRODUCING A SEALING GASKET
Filed July 22, 1959

WITNESSES:
Gordon H Telfer
James F. Young

INVENTOR
William M. Hickam
BY
Charles F. Renz
ATTORNEY

United States Patent Office 3,077,638
Patented Feb. 19, 1963

3,077,638
METHOD FOR PRODUCING A SEALING GASKET
William M. Hickam, Pittsburgh, Pa., assignor to Westinghouse Electric Corporation, East Pittsburgh, Pa., a corporation of Pennsylvania
Filed July 22, 1959, Ser. No. 828,840
4 Claims. (Cl. 18—59)

This invention relates to a process for producing sealing gaskets in general and, more specifically, to a process for producing sealing gaskets in vacuum or gas containing systems.

In the assembly of gas containing and high vacuum equipment, it is often desirable to use a gasketing material to provide a means for tightly sealing adjoining parts of the enclosure. It is common to use rubber-type gasketing materials for this purpose. However, most rubber materials at high temperature are highly permeable to gases and also may decompose to some extent and evolve gaseous products. Even at room temperature such gaskets are inadequate in many cases. In high vacuum systems, gasketing materials of gold, copper, or aluminum are often used. In this application, it is usually necessary to have extremely smooth surfaces and use very high pressures in order to obtain a tight seal, particularly if such seals will be subject to a temperature cycle of the order of 200° C.

Other materials have been considered for use as gasketing material. An example is solid polytetrafluoroethylene, sold under the trade name Teflon by E. I. du Pont de Nemours and Company. Disadvantages of using a solid sheet of this material, as a gasket member, are that the material in solid form is unable to flow into small surface imperfections which is necessary to produce a tight seal. Another disadvantage is that cold flow causes loosening of the seal with the passage of time. The phenomenon of cold flow is a dimensional change occurring to a considerable extent in fluorocarbon polymer material, of which polytetrafluoroethylene is one type, at room temperature but is accelerated at higher temperatures.

Other considerations which determine the selection of a gasketing material are: the type of gas the material will come into contact with, the desired life of the seal, the leakage rate which may be tolerated, the speed of assembly, the cost and other considerations.

It is therefore a general object of this invention to provide an improved method of forming a sealing gasket.

Another object is to provide an improved method of providing a sealing gasket from a paste, or plastic mixture, of a granulated fluorocarbon polymer gasketing material in relatively small particle size.

Another object is to provide a gasket seal which may be formed without the application of high pressure.

A further object is to provide a gasket seal of high tightness between unpolished surfaces.

Still another object is to provide a gasket seal for gas and vacuum joints which will not undergo any appreciable dimensional change at high temperatures.

These and other objects are effected by my invention as will be apparent from the following description taken in accordance with the accompanying drawings throughout which like reference characters indicate like parts and in which.

Figure 1:
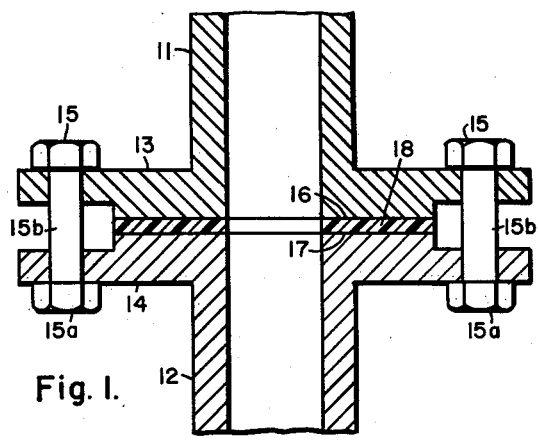
FIGURE 1 is a cross-sectional view of a sealing gasket assembly in accordance with the principles of my invention.

Referring now to the drawings, FIG. 1 shows a flange type coupling which may comprise a portion of a system containing a gas or high vacuum. The device shown is a generally cylindrical first pipe member 11 and a generally cylindrical second pipe member 12 coaxial with the first pipe member for the passage of gas therethrough. The first and second pipe members each have flanged portions 13 and 14 respectively disposed at juxtaposed ends of the pipe members. Upon said flanged portions is provided clamping means 15 to secure the flange portions 13 and 14 into engagement. This clamping means is shown in FIG. 1 as constituting conventional nuts 15a and bolts 15b, but it will be apparent that many other suitable means for clamping may be provided.

The flange portions 13 and 14 have facing surfaces 16 and 17. These surfaces are machine finished and have relatively extensive area. Between said facing surfaces is disposed a generally annular gasket 18 coextensive with surfaces 16 and 17, and formed in the manner described hereinafter. The gasket 18 comprises a very thin but continuous layer of a fluorocarbon polymer which may be, for example, polytetrafluoroethylene $(CF_2-CF_2)_n$, sold as Teflon by Dupont, or polychlorotrifluoroethylene $(CF_2-CC_1F)_n$, sold as KEL–F by M. W. Kellogg Company. Fluorocarbon polymers contain fluorine and carbon but may also contain additional elements.

To produce this gasket, it is necessary to form a suspension of one of the foregoing fluorocarbon polymer materials in a suitable liquid such as water, though many other liquids are also suitable. For this purpose, the bulk material should be ground by suitable mechanical means until it consists of particles which are of quite small size and have the appearance of granulated material. The diameter of such particles may be of about 1 micron or less. The amount of the powdered or granular material placed in the liquid is not critical. An example of the composition used in the course of experimenting on the present invention was to mix one part by volume of the granular material with two parts of water. It will be apparent hereinafter that the purpose of the water or other liquid is merely as a carrier for the granular particles in order that they will be relatively uniformly disposed on surfaces to which the suspension is applied. Therefore, the resulting suspension should have the consistency of a thin fluid paste. The surfaces 16 and 17 may be cleaned with an organic solvent to insure good contact. The fluid paste is then coated on only one or, if desired, both of the facing surfaces 16 and 17 where the gasket is to be formed. The surfaces are then allowed to dry in order to remove most of the liquid and leave an adherent coating of the fluorocarbon polymer material on the surfaces. In some applications, it may be desirable to coat the surfaces a second time or apply further coatings to obtain a thicker gasket. After removal of the liquid, the surfaces to be joined are clamped together by the clamping means 15 acting on the flange members 13 and 14 so that force is applied by the clamping means generally perpendicularly to the juxtaposed surfaces 16 and 17. Any additional water or liquid on the surfaces may then be removed by pumping out or baking out the system. Under the pressure produced by the clamping means the flour or paste of the fluorocarbon polymer material is molded into a continuous sheet, which conforms precisely to the surface contour of the facing surfaces 16 and 17.

In a typical example of the practice of the foregoing method, the following steps were carried out. A fluid paste was made comprising two parts by volume of water and one part by volume of granulated KEL–F. The machine finished flange surfaces were cleaned with acetone. The fluid paste, which should be shaken to insure considerable homogeneity, was then applied to one of the flange surfaces by means of a brush. The surface was covered with a thin coating of the paste. The coated surface was then allowed to stand in air at room temperature for about ten minutes to remove some of the liquid by evaporation. The uncoated flange surface was then positioned in engagement with the coated surface. By means of nuts and bolts positioned around the periphery of flanged members, the surfaces were brought into closer engagement. Some more water is removed from between the surfaces by this operation and, as will be more fully described hereinafter, the granular material is molded into a continuous sheet. The vacuum system of which the flange members comprised a portion was then evacuated by means of a vacuum pump. This insures the removal of any remaining water.

Figure 2:
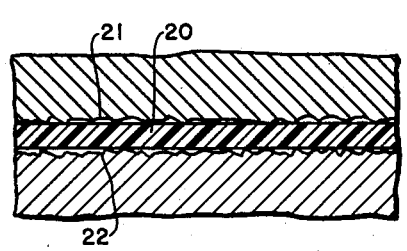
FIGS. 2, 3a and 3b are greatly enlarged, partial sectional views of gasket assemblies which are included for explanatory purposes.

FIG. 2 shows the result of using a solid sheet of fluorocarbon polymer material. Flange surfaces 21 and 22 are shown greatly magnified to indicate the presence of surface imperfections which normally exist on machine finished surfaces. Between surfaces 21 and 22 is a solid sheet of fluorocarbon polymer material 20. Flow of the solid material into the surface imperfections occurs only to a negligible extent. Without filling surface imperfections, a seal cannot be obtained which is tight enough for some applications such as to contain an ultra high vacuum.

Figure 3A:
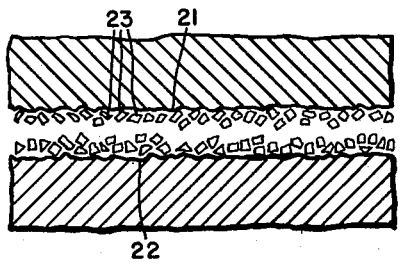
Figure 3B:
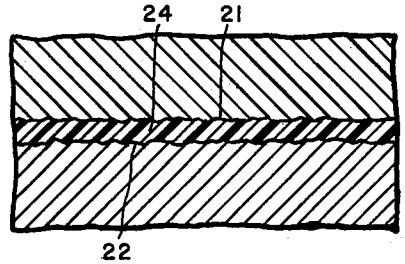

Since the particle size of the material used in my invention is so small, the particles are able to fill imperfections with the application of moderate pressure. FIG. 3a shows how the granular particles 23 appear on the surfaces 21 and 22 before pressure is applied. In this example, both surfaces have been coated with the fluid paste. It is seen that by merely coating the surfaces with the fluid paste in accordance with my invention, the imperfections are filled with the particles 23 of gasket material. FIG. 3b shows the resulting seal after the application of pressure. Adequate pressure may be applied by hand tools. The granular material has been molded into a continuous sheet 24 covering the surface area between surfaces 21 and 22 and filling the imperfections. The FIGS. 2, 3a and 3b show that the practice of my invention does not require highly polished surfaces, does not require the application of great pressure, but does result in a gasket conforming precisely with the surfaces to be joined.

The application of pressure, or pressure and heating, results in the granular particles bonding together to form a single gasket member of a thickness which may be up to about .060 inch. Resulting gasket thickness is naturally determined by the thickness of the applied coating of fluid paste. In most instances, an adequate seal will be formed with a gasket having a thickness of only a few mils. It has been found, however, that gaskets thicker than 60 mils suffer from considerable cold flow as has been previously described. To deform a solid sheet of fluorocarbon polymer material of comparable thickness would require the application of high pressure which could not be readily applied by hand tools. Extreme thinness of a gasket resulting from the practice of my invention reduces, for most applications, the effect of changes due to differential expansion of the gasket material and the flange material on heating. The extremely small exposed area of the gasket material significantly reduces gas permeability. In general, gas transferred through a medium is directly proportional to the area across which the pressure gradient exists and is inversely proportional to the thickness. Regarding sealing gaskets, this thickness is the difference in outside gasket radius and inner gasket radius. It is apparent that this thickness may be several inches or more using a gasket made in accordance with my invention.

The method of forming a sealing gasket in accordance with my invention may conveniently be used to join surfaces which are disposed in a vertical plane without the positioning and holding problems encountered when solid gaskets are used for that purpose.

In high vacuum equipment, it is essential to be able to raise the temperature of the system to an extent that gases adsorbed on the walls of the system may be pumped out. It is, of course, necessary that gaskets used in such systems can withstand these elevated temperatures. A seal formed in accordance with my invention on a three inch diameter flange has been tested over a temperature range of −50° C. to 200° C. with a helium leak detector. It is well known that many materials will crack at the lower end of this temperature range, or will be highly permeable to gases at the higher temperatures, or other deleterious effects will occur. However, the seal made in accordance with my invention gave no indication of leakage, although the system was immediately cooled from the high temperature by the application of Dry Ice in a helium atmosphere. The seal was rapidly cycled over this temperature range with no indication of mechanical cracking. The gasket formed has good mechanical strength and is so thin that it is impossible for cold flow to occur to any appreciable extent as is experienced in thicker gaskets of the same material which are made from a solid sheet. The gasket has been found to enable holding of the vacuum system to a pressure of about $10^{-9}$ or $10^{-10}$ mm. of mercury.

The system shown in FIG. 1 may be considered as representative of many different gas enclosures as well as vacuum systems. For example, the embodiment shown may be a portion of an electrical apparatus such as a circuit breaker or a transformer containing sulfur hexafluoride. Sulfur hexafluoride gas is often used in such equipment because of its favorable dielectric properties. It is apparent that loss of the gas from the enclosure or introduction of air, would deteriorate the break-down resistance of the enclosed gas and possibly result in severe damage to the equipment. Therefore, it is desirable that a gasket material be used which provides a tight seal but which still does not necessitate high machining costs. One characteristic of $SF_6$ is the rather high corrosiveness of the products resulting when an electrical discharge is passed through it. Therefore, it is required that the gasketing material used should be chemically inert. A seal made in accordance with the teaching of my invention fulfills these requirements and is particularly suitable for this application.

Figure 4:
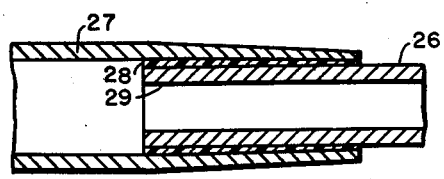
FIG. 4 is a sectional view of an alternate embodiment of my invention.

FIG. 4 shows an application of my invention to the joining of metallic tubes. The cylindrical tubes 26 and 27 are joined by coating the inner surface 28 of tube 27 or the outer surface 29 of tube 26 or both with a fluid paste as has been previously described. The outer tube 27 is then swaged over the inner tube 26 resulting in the formation of a molded gasket.

In all applications of the present invention, it is important that the force applied to the surfaces to be joined be substantially perpendicular to the surfaces. The application of a lateral force acts to wipe off the coated paste resulting in a gasket having discontinuities which decreases the tightness of the seal.

Figure 5:
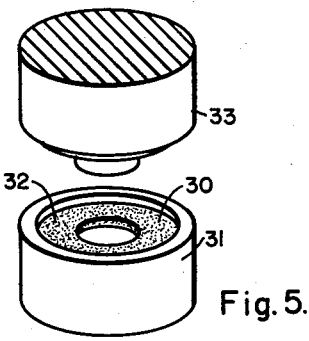
FIG. 5 is a perspective view of a device for forming a gasket in accordance with a teaching of my invention.

An alternate method of practicing my invention is by use of the device shown in FIG. 5. An annular mold 31 is shown having a surface 30 to which a paste of fluorocarbon polymer material 32 has been applied. The surface 30 should be relatively highly polished and may suitably be of glass or stainless steel. The compression member 33 is provided with means adapted to bring it into position against the surface 30 and to apply to the granular fluorocarbon polymer material a relatively slight force capable of causing the particles to mold together to a slight extent but still retain their particle nature. Release of compression means 33 leaves on the surface 30 a preformed gasket of the fluorocarbon polymer material which is elastic and appears rough. This preformed gasket may be removed from the polished surface 30 by peeling it off. It may then be used in a gasket assembly such as that shown in FIG. 1. In manufacturing operations where standardized gaskets may be used, this preforming operation may be particularly useful. Since the preformed gasket is not fully molded, it is more readily deformed into the imperfections on flanged surfaces than a solid sheet is.

While the present invention has been described in only a few embodiments, it will be apparent to those skilled in the art that the practice of this invention may assume many additional forms, without departing from the spirit and scope of the invention.

I claim as my invention:

1. The method of forming a relatively thin gas or vacuum tight gasket between relatively extensive contiguous surfaces of a flange type coupling including the steps of: coating one of the relatively extensive flange surfaces with a fluid paste of a fluorocarbon polymer material of a granular consistency, positioning the second cooperating relatively extensive surface into engagement with said first coated relatively extensive flange surface, applying compressive force across the two aforesaid relatively extensive flange surfaces substantially perpendicularly thereto to mold said gasketing material into a unitary gasket substantially conforming to the irregularities of said two relatively extensive surfaces and having a thickness not greater than 0.060 inch, and drying said fluid paste to remove the fluid component of said paste.

2. The method of forming a relatively thin gas or vacuum tight gasket between relatively extensive contiguous surfaces of a flange type coupling including the steps of: coating one of the relatively extensive flange surfaces with a fluid paste of a polytetrafluoroethylene material of a granular consistency, positioning the second cooperating relatively extensive surface into engagement with said first coated relatively extensive flange surface, applying compressive force across the two aforesaid relatively extensive flange surfaces substantially perpendicularly thereto to mold said gasketing material into a unitary gasket substantially conforming to the irregularities of said two relatively extensive surfaces and having a thickness not greater than 0.060 inch, and drying said fluid paste under said compressive force to remove the fluid component of said paste.

3. The method of forming a relatively thin gas or vacuum tight gasket between relatively extensive contiguous surfaces of a flange type coupling including the steps of: coating one of the relatively extensive flange surfaces with a fluid paste of polychlorotrifluoroethylene material of a granular consistency, positioning the second cooperating relatively extensive surface into engagement with said first coated relatively extensive flange surface, applying compressive force across the two aforesaid relatively extensive flange surfaces substantially perpendicularly thereto to mold said gasketing material into a unitary gasket substantially conforming to the irregularities of said two relatively extensive surfaces and having a thickness not greater than 0.060 inch. and drying a fluid paste under said compressive force to remove the fluid component of said paste.

4. The method of forming a gas or vacuum tight gasketed joint between cooperating surfaces of members to be joined comprising the steps of: coating one of said surfaces with a fluid paste of fluorocarbon polymer material of granular consistency, positioning the other cooperating surface into engagement with said first coated surfaces, applying a compressive force substantially perpendicularly to said surfaces to mold said gasketing material into a unitary gasket having a thickness not greater than about 0.060 inch substantially conforming to the irregularities of said two cooperating surfaces and drying the fluid paste to remove the fluid component thereof.

References Cited in the file of this patent

UNITED STATES PATENTS

| 2,312,579 | O'Brien | Mar. 2, 1943 |
| 2,400,094 | Benning | May 14, 1946 |
| 2,448,483 | Bassett | Aug. 31, 1948 |
| 2,463,231 | Wyatt | Mar. 1, 1949 |
| 2,715,617 | White | Aug. 16, 1955 |
| 2,766,054 | Everhart | Oct. 9, 1956 |
| 2,770,476 | Cleverly | Nov. 13, 1956 |
| 2,889,582 | Cooper | June 9, 1959 |

FOREIGN PATENTS

| 566,811 | Canada | Dec. 2, 1958 |